United States Patent [19]

Marinelli et al.

[11] Patent Number: 5,461,477
[45] Date of Patent: Oct. 24, 1995

[54] METHOD AND APPARATUS FOR IMAGING

[75] Inventors: William J. Marinelli, Andover, Mass.; Karl W. Holtzclaw, E. Hampstead; Steven J. Davis, Londonderry, both of N.H.; Byron D. Green, Reading, Mass.

[73] Assignee: Physical Sciences, Inc., Andover, Mass.

[21] Appl. No.: 402,314

[22] Filed: Mar. 10, 1995

Related U.S. Application Data

[63] Continuation of Ser. No. 21,207, Feb. 23, 1993, abandoned.
[51] Int. Cl.⁶ .................................. G01B 9/02; G01J 3/28
[52] U.S. Cl. ................ 356/352; 356/320; 356/331; 356/333; 250/505.1; 250/345; 250/343
[58] Field of Search ...................... 356/352, 343, 356/437, 4.5, 35.5, 345, 318, 359, 360, 147, 237, 307, 320, 346, 331; 250/345, 505.1, 343

[56] References Cited

U.S. PATENT DOCUMENTS

| | | | |
|---|---|---|---|
| 4,084,100 | 4/1978 | Begley et al. | 356/320 |
| 4,195,931 | 4/1980 | Hara | 356/346 |
| 4,269,509 | 5/1981 | Berry et al. | 356/301 |
| 4,400,058 | 8/1983 | Durand et al. | 350/166 |
| 4,448,529 | 5/1984 | Krause | 356/310 |
| 4,627,722 | 12/1986 | Falk et al. | 356/4.5 |
| 4,710,001 | 12/1987 | Lacey | 350/632 |
| 4,833,314 | 5/1989 | Pepper et al. | 250/201 |
| 4,893,003 | 1/1990 | Hays | 250/216 |
| 4,998,017 | 3/1991 | Ryan et al. | 356/352 |
| 5,050,991 | 9/1991 | Welch | 356/326 |
| 5,059,026 | 10/1991 | Zoechbauer | 356/346 |
| 5,225,888 | 7/1993 | Selwyn et al. | 356/346 |

FOREIGN PATENT DOCUMENTS 2239554  7/1991  United Kingdom ............ H01L 41/09

OTHER PUBLICATIONS

*Applied Optics and Optical Engineering*, Rudolf Kingslake, Ed., Academic Press, New York, (1967) vol. IV, Part I, pp. 344–347.

International Search Report for Int'l Appl. No. PCT/US94/02009 (7 pages).

Poglitsch et al., "The MPE/UCB Far-infrared Imaging Fabry–Perot Interferometer (FIF)", International Journal of Infrared and Millimeter Waves, vol. 12, No. 8, 1991, pp. 859 884.

Roesler et al., "Fabry–Perot/CCD Observations of [S III] and [S II] Emissions from the Jupiter Plasma Torus", The Astrophysical Journal, vol. 259, Aug. 15, 1982, pp. 900–907.

Bonaccini et al., "High resolution solar didimensional spectroscopy with a Universal Birefringent Filter in tandem with a Fabry–Perot interferometer: tests and experimental results", Astron. Astrophys., vol. 229, 1990, pp. 272–278.

Burton et al., "Electrooptic Fabry–Perot filter: development for the study of solar oscillations", Applied Optics, vol. 26, No. 13, Jul. 1, 1987, pp. 2637–2642.

Reay et al., "A tinable Fabry–Perot filter for the visible", Journal of Physics E. Scientific Instruments, vol. 7, 1974, pp. 673–677.

(List continued on next page.)

Primary Examiner—Robert P. Limanek
Assistant Examiner—Alexander Oscar Williams
Attorney, Agent, or Firm—Testa, Hurwitz & Thibeault

[57] ABSTRACT

A spectrometer comprises a tunable interferometer for producing a monochromatic continuous image at an image plane and including two mirrors having substantially parallel surfaces and an adjustable spacing therebetween, a radiation detector located at the image plane for recording the image, a filter arrangement for allowing at least one predetermined range of wavelengths to pass to the detector, and a lens arrangement for collecting radiation and limiting radiation incident on the interferometer to an angle which is substantially perpendicular to the substantially parallel surfaces of the two mirrors.

36 Claims, 5 Drawing Sheets

OTHER PUBLICATIONS

Reay et al., "Liquid–nitrogen–cooled Servo–stabilized Fabry–Perot Interferometer for the Infrared", *Optical Engineering*, vol. 31, No. 8, Aug. 1992, pp. 1667–1670.

Atherton et al., "Tunable Fabry–Perot Filters", *Optical Engineering*, vol. 20, No. 6, Nov./Dec. 1981, pp. 806–814.

METHOD AND APPARATUS FOR IMAGING

This is a continuation of application Ser. No. 08/021,207 filed on Feb. 23, 1993 now abandoned.

FIELD OF THE INVENTION

This invention relates methods and apparatus for imaging, and more particularly, to methods and apparatus which form monochromatic, continuous images using a tunable interferometer.

BACKGROUND OF THE INVENTION

An imaging system capable of recording images in a narrow range of light frequencies can be useful when imaging a scene having various components which emit or absorb radiation at specific, typically different, frequencies. Using such a monochromatic imaging system, spatial and spectral information can be recorded about a particular component in the scene. Some imaging applications require an imaging system which can not only record images in a narrow range of light frequencies but which has high sensitivity, high spectral resolution, and high operational data rates. Such applications include aeronomic research, military, and environmental. For aeronomic research applications, such a monochromatic imaging system can be used to detect spatial and spectral information useful in determining specific atmospheric constituents. For military applications, such a system can aid in the identification and location of chemical agents, equipment, and personnel. In environmental applications, such a system can monitor the transportation of hazardous substances from waste sites and monitor pollutants released from manufacturing installations.

Some known monochromatic imaging systems and methods use conventional bandpass or interference filters. While such bandpass or interference filters offer high throughput and thus good sensitivity to weak signals, only moderate (1 to 2% of center wavelength) spectral resolution is possible and only discrete frequencies can be observed. Also, because multiple bandpass or interference filters typically are employed, the physical size and mechanical complexity of a system including such filters is increased as compared to a system which does not include such filters.

It also is known to use circular variable filter (CVF) spectrometers and linear variable filter spectrometers in monochromatic imaging applications. While these spectrometers can be continuously tunable in wavelength, they typically deliver only moderate spectral resolution and achromatic images. If high spectral resolution is required, only a small portion of a filter wheel associated with the spectrometer can be illuminated because different portions of the wheel pass different frequencies. Decreased throughput and sensitivity to weaker signals results when only a small portion of the wheel is illuminated.

Monochromatic imaging also can be achieved with known grating spectrometers which use toroidal optics. These grating spectrometers typically are designed specifically to achieve high spectral resolution imaging. These grating spectrometers, however, provide low throughput since incoming light must be passed through an entrance slit and imaging occurs only along one dimension. Because spectral dispersion occurs in the other dimension at an image plane, two-dimensional imaging can be achieved by recording a scene twice with the spectrometer's orientation changing by 90 degrees between recordings, but this method tends to be impractical and inappropriate for rapidly changing scenes.

Some known monochromatic imaging systems use Fabry-Perot interferometers (FPIs). In general, advantages of a FPI include high spectral resolution and high throughput which can be due to the large input aperture typically associated with a FPI. An FPI typically is operated in "high order" meaning that the spacing of mirrors in the FPI is much greater than the transmission wavelength of the FPI. When operated in high order, the FPI typically produces, at an image plane, a discontinuous image which can be a series of concentric circles with or without a spot at the center. Only information associated with the portions of an imaged scene which are coincident with the concentric rings and the central spot are present in the discontinuous image. Space between the rings contains no information about the imaged scene. To obtain all information associated with the imaged scene, a continuous image must be constructed from the discontinuous image. Algorithms for constructing a continuous image from the discontinuous image are known. A computer typically is employed to execute such algorithms.

SUMMARY OF THE INVENTION

In general, in one aspect, the invention features a spectrometer comprising (i) a tunable interferometer for producing a monochromatic continuous image at an image plane and including two mirrors having substantially parallel surfaces and an adjustable spacing therebetween, (ii) a radiation detector located at the image plane for recording the image, (iii) a filter arrangement for allowing at least one predetermined range of wavelengths to pass to the detector, and (iv) a lens arrangement for collecting radiation and limiting radiation incident on the interferometer to an angle which is substantially perpendicular to the parallel surfaces of the two mirrors.

Embodiments of this aspect of the invention include the following features.

The angle preferably is approximately 0.1 radians or less, and a total finesse value associated with the interferometer preferably is approximately 50. The interferometer preferably operates in the infrared range of wavelengths.

The spectrometer can include a tuner for adjusting the spacing between the two mirrors and thereby tuning the interferometer to select substantially a single predetermined wavelength or a narrow range of predetermined wavelengths, and a processor module for processing the image recorded by the detector prior to display of the image. The tuner can utilize one or more transducers, preferably solid-state piezoelectric transducers, to control the spacing between the mirrors and generally control the position of each of the mirrors with respect to each other.

The radiation detector can be a single element, a linear array of optoelectronic detectors, or a two-dimensional array of optoelectronic detectors for recording a two-dimensional monochromatic continuous image.

The filter arrangement can be one or more order-sorting interference filters, one or more bandpass filters, or a tunable bandpass filter which can be a second tunable interferometer. The lens arrangement can be a telecentric lens.

In general, in another aspect, the invention features a method of producing a monochromatic continuous image by (i) providing a tunable interferometer including two mirrors having substantially parallel surfaces and an adjustable spacing therebetween, (ii) generating, by the interferometer, a monochromatic continuous image at an image plane, (iii) allowing, by a filter arrangement, at least one predetermined range of wavelengths to pass to a radiation detector located at the image plane, (iv) collecting, by a lens arrangement, radiation output from the interferometer, (v) limiting, by the lens arrangement, the angle of radiation incident on the interferometer to substantially perpendicular to the parallel surfaces of the two mirrors, and (vi) recording, by the radiation detector, the image.

Another aspect of the invention relates to a spectrometer for forming a two-dimensional monochromatic continuous image. The spectrometer comprises (i) a tunable interferometer including two mirrors having substantially parallel surfaces and a spacing therebetween which is continuously adjustable and which is set to approximately five times a predetermined wavelength or less, (ii) an optical system for collecting radiation output from the interferometer and for restricting radiation incident on the interferometer to an angle which is substantially perpendicular to the parallel surfaces of the two mirrors, (iii) a filter for passing substantially only the predetermined wavelength, and (iv) a radiation detector for receiving radiation output from the optical system and for recording a two-dimensional monochromatic continuous image.

Embodiments of this aspect of the invention include the following features.

The angle preferably is approximately 0.1 radians or less, and a total finesse value associated with the interferometer preferably is approximately 50.

The spectrometer can include a tuner for adjusting the spacing between the two mirrors to enhance the contrast of the image and to tune the interferometer to pass substantially a single predetermined wavelength selected or a narrow range of predetermined wavelengths. The spectrometer also can include a processor module for processing the image to enhance the contrast of the image.

A spectrometer according to the invention can record all information associated with an imaged scene in a narrow range of wavelengths (or at a particular wavelength) which can be selected rapidly and easily. The spectrometer can produce one-dimensional cross-sectional views and two-dimensional images.

Other aspects, features, and advantages of the invention will become apparent from the following description and from the claims.

DETAILED DESCRIPTION

A spectrometer according to the invention includes a tunable interferometer, such as a Fabry-Perot interferometer (FPI), having a transmission function which produces a continuous image at an image plane. That is, the tunable interferometer produces an image at the image plane which does not have concentric rings with space therebetween. The continuous image produced at the image plane contains all information associated with a scene being imaged.

In general, a spectrometer according to the invention can be operated in either "low order" or "high order." In low order, the mirror spacing of the interferometer typically is equal to or less than five times a wavelength of interest, and preferably equal to a wavelength of interest divided by two. In high order operation, the mirror spacing generally is not so limited.

A large spectral tuning range of the interferometer (and thus the spectrometer) is realized when the interferometer is operated in low order. In the lowest possible order, which occurs when the mirror spacing equals one-half of the wavelength of interest, the largest possible spectral tuning range is realized. Although the spectral resolution of the interferometer is minimized when the interferometer is operated in low order and is a minimum when its operated in the lowest order, a relatively high total finesse value of the interferometer can readily be achieved (e.g., 50 or greater) such that the spectral resolution is about 2% of the wavelength of interest. This spectral resolution typically is adequate for many applications such as remote sensing or quantitative measurement of image emission or absorbance of radiation.

For better spectral resolution, the spectrometer can be operated in high order. Low and high order operation is described in more detail below.

Figure 1:
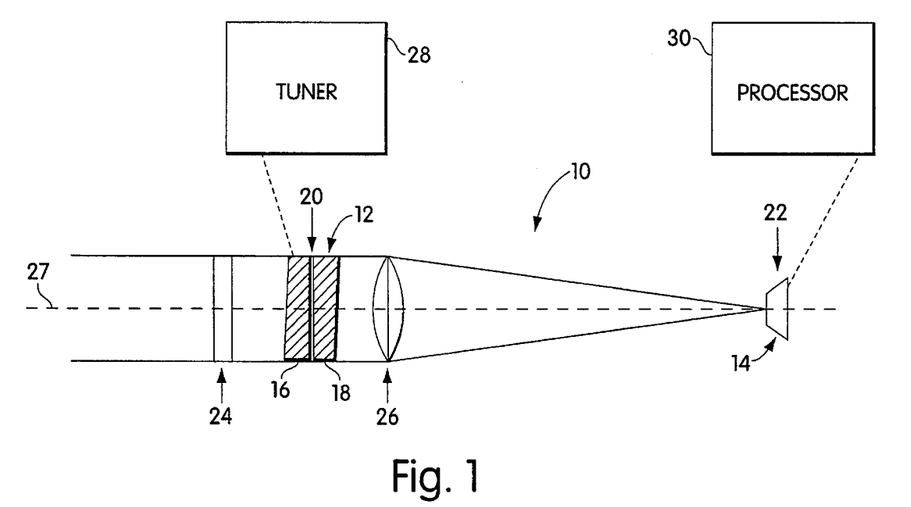
FIG. 1 is a functional block diagram of a spectrometer according to the invention.

Referring to FIG. 1, in one embodiment, a spectrometer 10 according to the invention includes a tunable interferometer 12 for producing a monochromatic continuous image at an image plane 14. The interferometer 12 includes two mirrors 16, 18 having substantially parallel surfaces and an adjustable spacing 20 therebetween. The interferometer 12 can be, for example, a Fabry-Perot interferometer. A radiation detector 22 located at the image plane 14 records the image. A filter arrangement 24 allows at least one predetermined range of wavelengths to pass to the detector 22. A lens arrangement 26 collects radiation and limits radiation incident on the interferometer 12 to angles which are substantially perpendicular to the substantially parallel surfaces of the two mirrors 16, 18 as indicated by a dashed line 27. In general, this embodiment of the spectrometer can be operated in either low order or high order.

The tunable interferometer 12 spectrally resolves incoming radiation from a scene being imaged and transmits only wavelengths of radiation for which the mirror spacing 20 constitutes a half-integer multiple or order (m) of the wavelength of interest. The order of operation is described below, but briefly, it is represented by an integer value of one or greater. The interferometer 12 is tuned by adjusting the spacing 20 until the wavelength(s) passed by the interferometer 12 are equal to the wavelength(s) of interest.

The filter arrangement 24 ideally rejects all radiation except a narrow range of wavelengths which includes the wavelength(s) of interest. The filter arrangement 24 can be, for example, one or more interference filters or one or more order-sorting interference filters such as one or more bandpass filters. Because any scene generally includes two or more wavelengths and the interferometer 12 generally is capable of transmitting all such wavelengths, the filter arrangement 24 serves to remove the unwanted wavelengths. When the wavelength range of interest is monitored at lowest order, only light of wavelengths shorter than the wavelength range of interest can be simultaneously transmitted by the interferometer 12. Consequently, the filter arrangement 24 can be a long wavelength pass filter. In certain situations, the filter arrangement 24 can be a bandpass filter or filters to isolate the wavelength range of interest. In general, the filter arrangement 24 can include a bandpass filter for higher order operation, unless the detector 22 is unresponsive at the wavelengths transmitted outside the desired bandpass.

The lens arrangement 26 collects light from the imaged scene in the far field and forms an image at the image plane 14. The lens arrangement 26 can be any optical device which allows only near-perpendicular incidence of the incoming radiation onto the interferometer 12 such as a telecentric lens assembly.

The detector 22 can be a single detector element or a linear array of detector elements capable of recording one-dimensional monochromatic continuous images, but preferably is a two-dimensional array of detector elements capable of recording two-dimensional monochromatic continuous images rapidly. Regardless of the construct of the detector 22, the detector elements utilized preferably are optoelectronic devices, such as photodiodes, which can provide a linear response to a wide range of incident intensities in the spectrum range from the ultra-violet to the LWIR.

The spectrometer 10 preferably is operated in the infrared range of wavelengths but can be operated in other regions of the spectrum.

The spectrometer 10 can further include a tuner 28 and/or a processor module 30. The tuner 28 can be used to adjust the spacing 20 between the two mirrors 16, 18 and thereby tune the interferometer 12 to selectively transmit a single wavelength of interest or a narrow range of wavelengths of interest. The tuner 28 can include one or more actuators for moving the mirrors 16, 18 such as piezoelectric transducers. In general, each of the mirrors 16, 18 can be moved independently of the other and in any of three-dimensions. The processor module 30 can process data recorded by the detector 22 to create the image, and the image can be displayed on a monitor (not shown). The processor module 30 can include a computer such as a personal computer available from IBM or Apple.

Some mathematical relationships associated with a tunable interferometer are presented below to aid in and provide a basis for further describing a spectrometer according to the invention and its operation.

Figure 2:
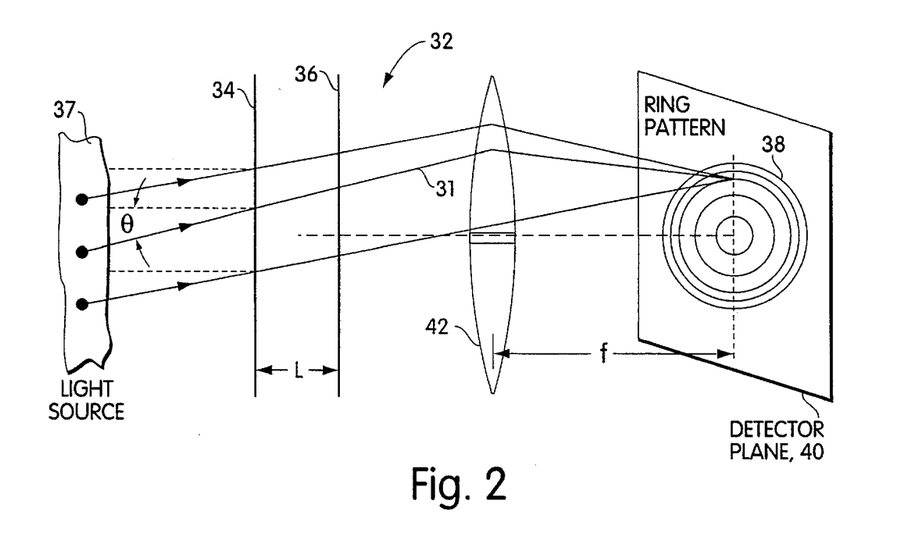
FIG. 2 is a functional block diagram illustrating the operation of a tunable interferometer such as a Fabry-Perot interferometer.

As shown in FIG. 2, in general, the transmission of light 31 by a tunable interferometer 32 such as a Fabry-Perot interferometer is governed by $$\cos \Theta = (m\lambda)/(2L)$$

where $\Theta$ is the angle of incidence of the impinging light, m is the order in which the desired radiation is transmitted, $\lambda$ is the wavelength of the transmitted light, and L is the spacing between the mirrors 34, 36 of the interferometer. When light of a single wavelength 37 is allowed to impinge upon the mirrors 34, 36 of the interferometer 32 from a sufficiently large range of angles $\Theta$, a series of concentric rings 38 is produced at an image plane 40 where a detector (not shown) typically is located. A lens 42 disposed a distance f (the focal length) from the image plane 40 focuses the light 31 exiting the interferometer 32 onto the image plane 40. The appearance of the concentric rings 38 indicates the tunable interferometer 32 is operating conventionally, and in high order (i.e., m>>1). This operation of the interferometer 32 causes the image of the scene in the far field to be convoluted. That is, only information about the scene which is coincident with the transmission maxima of the interferometer 32 is observable at the image plane 40 and then only if the scene absorbs or emits light at the wavelength(s) transmitted by the interferometer 32.

A tuning range between orders (i.e., the span of wavelengths between orders) and a spectral resolution of the interferometer 32 are described by a Free Spectral Range (FSR) value and a total finesse ($F_T$) value. The FSR is given by $$\Delta\omega_{FSR} = 1/(2L)$$

and the spectral resolution is given by $$\Delta\omega_{1/2} = \Delta\omega_{FSR}/F_T = 1/(2LF_T)$$

where $\omega$ is the frequency of the light in wavenumbers and is the reciprocal of the transmission wavelength expressed in units of centimeters. Factors which determine the total finesse include reflectivity ($F_R$) of the mirrors 34, 36, flatness of the surfaces of the mirrors 34, 36 ($F_S$), parallelism ($F_P$) of the surfaces of the mirrors 34, 36, a range of angles of incidence of the light ($F_A$) with respect to the normal to the surfaces of the mirrors 34, 36. The total finesse of the interferometer 32 is given by $$1/F_T = ((1/F_R^2) + (1/F_P^2) + (1/F_A^2) + (1/F_S^2))^{1/2}.$$

Reflectance is defined by $$F_R = (\pi R^{1/2})/(1-R)$$

where R is the reflectance of the mirrors 34, 36, T is the transmittance of the mirrors 34, 36, and the sum of R, T, and A (the absorbance of the mirrors 34, 36) is unity. Flatness is given by $$F_S = \lambda/(2((2\Delta S)^{1/2}))$$

where $\Delta S$ is the average surface roughness of the mirrors 34, 36. Parallelism is given by $$F_P = \lambda/(2\Delta P)$$

where $\lambda$ is the transmission wavelength and $\Delta P$ is the deviation of the mirrors 34, 36 from parallel. $F_A$, which also is representative of an exit aperture associated with the interferometer 32, is defined by $$F_A = \lambda/(L(\Delta\theta)^2) = (4\lambda f^2)/(Lw^2)$$

where $\Delta\theta$ is the angular field-of-view (FOV) of the interferometer 32 in units of radians, f is the focal length of the lens 42 at the exit aperture of the interferometer 32, and w is the dimension of the detector (not shown in FIG. 2)) or field stop at the image plane 40.

Referring again to FIG. 1, for the spectrometer 10 according to the invention, the angle $\Theta$ indicated in FIG. 2 is maintained at approximately zero (e.g., 0.1 radians or less) such that the impinging light is approximately normal to the surfaces of the mirrors 16, 18 of the tunable interferometer 12 and thus $$\cos \Theta = (m\lambda)/(2L)$$

reduces to $$L = (m\lambda)/2.$$

According to the invention, the value of the order (m) in this equation for the spacing 20 (L) of the mirrors 16, 18 of the interferometer 12 is limited to integers which result in a continuous image at the detector 22. Also, the total finesse of the interferometer 12 preferably is approximately 50. To achieve these results, the FOV of the interferometer 12 preferably is limited to a narrow range of angles around 90 degrees relative to the plane of the mirrors 16, 18 (e.g., $\Delta\theta \leq 15$ degrees), the mirror reflectance preferably is greater than 0.95 (i.e., $R \geq 0.95$), the mirror surface finish should be greater than $\lambda/100$ (i.e., $\Delta S \leq \lambda/100$) and preferably is $\lambda/200$, and the mirror parallelism should be better than or comparable to the mirror surface finish (e.g., $\Delta P = \lambda/200$). Mirrors made by placing broadband reflective coatings on transparent substrates can be employed to achieve a broad range of spectral coverage consistent with the relatively large FSR of a spectrometer according to the invention.

As mentioned previously, for low order operation, the mirror spacing 20 of the interferometer 12 typically is equal to or less than five times a wavelength of interest. This means that m in $$L = (m\lambda)/2$$

is equal to an-integer between one and ten, inclusive. Note that if the transmission order (m) is unity, the mirror spacing 20 is given by $$L = \lambda/2.$$

When the spectrometer 10 according to the invention is operated in the lowest order (i.e., m=1), the FSR spans a full octave ($\omega \rightarrow 2\omega$) of frequencies which is the largest spectral tuning range possible with the tunable interferometer 12. Also, in lowest order operation, the spectral resolution, which is given by the FSR divided by the total finesse, is at its maximum fraction of the transmission wavelength for a defined set of interferometer mirror and optical train characteristics- Since the FSR is greatest at lowest order, the spectral resolution is correspondingly the lowest possible for a given total finesse. If the filter arrangement 24 is realized by order-sorting interference filters (e.g., bandpass filters), the number of such filters required to isolate free spectral ranges is minimized when the spectrometer 10 is operated in the lowest order. For example, two bandpass filters, one designed to pass wavelengths from 3 to 6 micrometers and another designed to pass wavelengths from 6 to 12 micrometers, can be used to resolve a scene in the 3 to 12 micrometer spectral range.

In higher order operation, the FSR of the spectrometer 10 generally is reduced from the full octave associated with lowest order operation by the order (m), while the spectral resolution generally is improved by a factor of m. In this higher order operation, the filter arrangement 24 can be realized by a tunable bandpass filter such as a second tunable interferometer similar to the interferometer 12. In this configuration, the second interferometer is operated in a low order and provides input to the interferometer 12 which is operated in a high order such that the FSR of the interferometer 12 is comparable to the spectral resolution of the second interferometer. The second interferometer thus acts to isolate a single FSR of the higher-order interferometer 12, and the second interferometer effectively serves as a continuously variable wavelength bandpass filter.

Regardless of the order of operation (m), the transmission function of the spectrometer 10 does not produce concentric rings at the image plane 14 but instead produces a continuous image containing substantially all of the light intensity fom the object. The spectrometer 10 thus allows all details in an imaged scene to be recorded in a narrow range of wavelengths defined by the mirror spacing 20 and the spectral resolution of the spectrometer 10. In contrast, only the portions of a scene that are coincident with the concentric rings (and central spot, if present) produced by a conventionally-operated tunable interferometer can be recorded over the same narrow range of wavelengths.

As stated previously, it is preferred that the spectrometer 10 operate in the infrared region of the spectrum. This region is preferred because, for example, adjustment of the mirror spacing 20 (and, in general, the separate three-dimensional positioning of each mirror) is achievable with piezoelectric actuators, the mirror surface finish and parallelism values necessary to achieve good finesse and thus good spectral resolution are more easily achieved at longer wavelengths, and compact directional sources of visible radiation (e.g., helium neon and diode lasers) are readily available and such sources can be used to establish the requisite parallelism of the two mirrors and the plate spacing.

Figure 3:
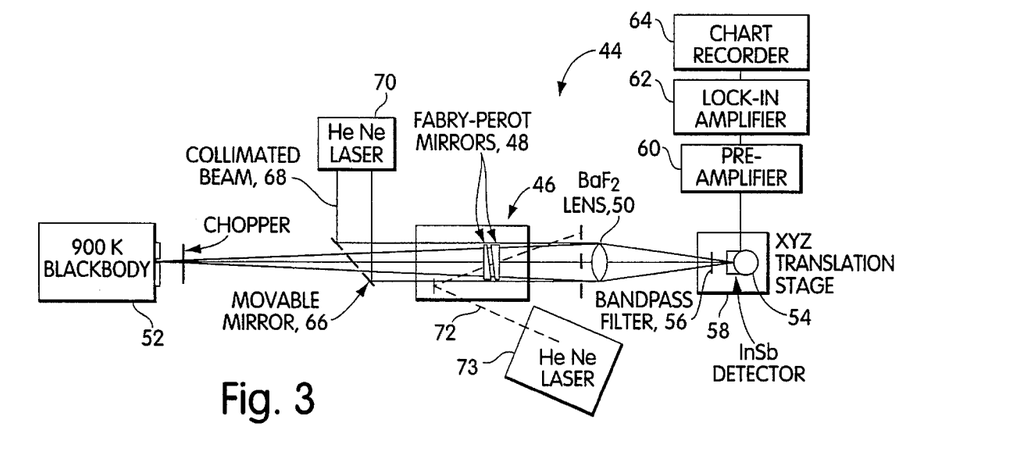
FIG. 3 is a low-order embodiment of a spectrometer system according to the invention.

Referring to FIG. 3, in one low-order embodiment in accordance with the invention, a spectrometer system 44 includes a Fabry-Perot interferometer (FPI) 46 equipped with a pair of highly reflecting dielectric-coated mirrors 48 which can be on zinc-selenide substrates. The mirrors 48 of the FPI 46 have a 5.1 cm clear aperture. A suitable FPI is available as model RC-140 from Burleigh Instruments. A single lens 50 of barium fluoride collects light from a chopped, blackbody emission source 52 and imaged it onto a single element indium antimonide detector 54. An order sorting filter 56 composed of 4.67 μm longpass and 5.05 μm shortpass filters serves to limit incident radiation to wavelengths where the mirror reflectance is high (e.g., greater than 99%). The detector 54 is mounted on a precision XYZ translation stage 58 to allow motion in and perpendicular to an image plane. Signals from the detector 54 are preamplified by a preamplifier 60 before being processed with a lock-in amplifier 62 and recorded on, for example, a chart recorder 64.

A translatable mirror 66 can be incorporated into the apparatus to allow introduction of an expanded and collimated beam 68 from a helium neon laser 70 at, for example, 0.6328 μm. The beam 68 can be used to establish the parallelism of the mirrors 48 by adjusting the mirrors' mounts (not shown) until the entire 5.1 cm aperture transmits the red laser light 68 evenly. This exercise can be repeated before each test of the interferometer 46 to establish the parallelism of the mirrors 48. The order of transmission for 0.6328 μm radiation can be determined by measuring the input angle at which the transmission maximum corresponding to $$m = m_{max} - 1$$

occurred. This angle is uniquely related to the spacing between the mirrors 48 and transmission order for mirrors positioned to deliver highest order transmission of laser radiation perpendicular to the mirror surfaces. A second, unexpanded, beam 72 from another helium neon laser 73 can be introduced onto the mirrors 48 to establish the input angle. Measurement of this angle allowed the order of operation at 0.6328 μm to be estimated via $$\cos \Theta = (m\lambda)/(2L).$$

Knowledge of the desired wavelength in the infrared (IR) thus allows the corresponding transmission order in the IR to be determined.

With a radiation of approximately 5 μm wavelength, the corresponding interferometer transmission order is m=4 based on the method described in the preceding paragraph. A free spectral range (FSR) of approximately 500 cm$^{-1}$ is associated with the system 44 of FIG. 3. Based on the equations given previously, this FSR corresponds to m=4 and a mirror spacing of 10 μm, and thus the above-approach for establishing the transmission order is verified. It is possible to achieve lower maximum order and thus closer mirror spacing if typical sources of error such as dust in the laboratory and imperfections in the dielectric coatings of the mirrors 48 are eliminated. In general, the flatness of the mirrors (which can be λ/200 at 10.6 μm) tends to dominate the typical sources of error and allow lowest order operation to occur.

Figure 4A:
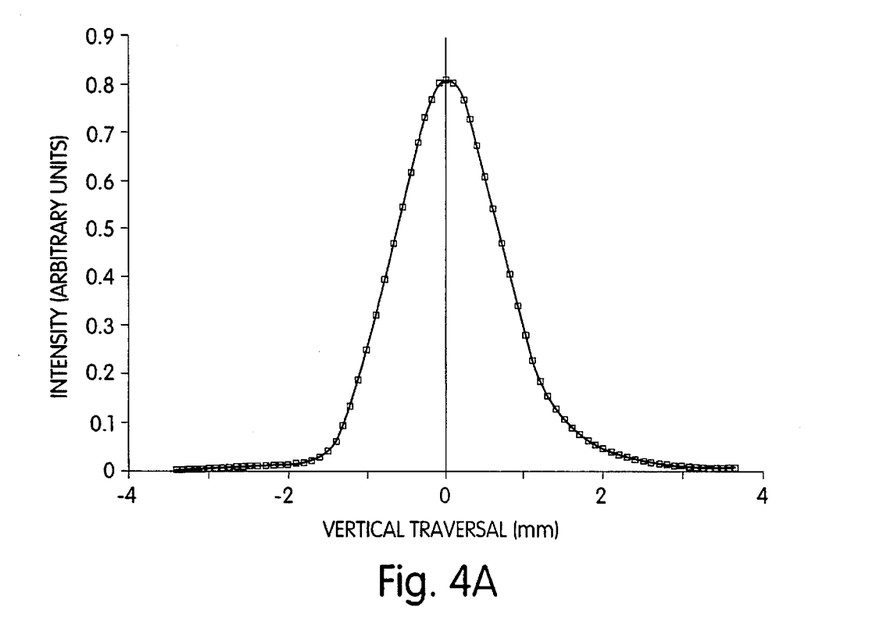
FIGS. 4A and 4B are graphical illustrations of light intensity versus detector position when a single pinhole is imaged with the spectrometer system of FIG. 3.
Figure 4B:
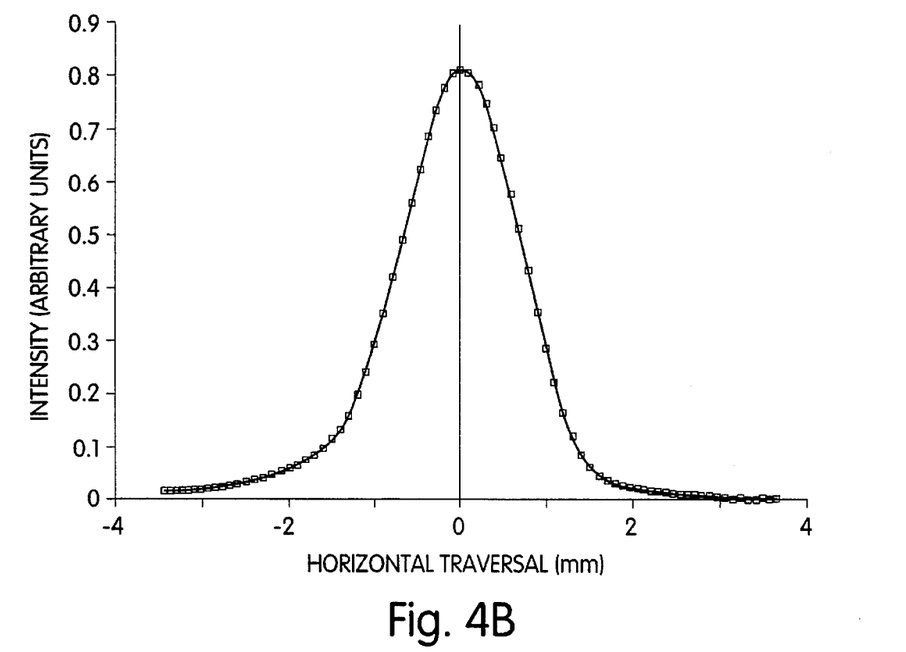

The imaging capability of the spectrometer system 44 can be evaluated using a mask (not shown) located between an input aperture of the FPI 46 and the blackbody light source 52. FIGS. 4A and 4B show the results of measurements of light intensity when the detector 54 is translated along both axes perpendicular to the optical axis of the spectrometer system 44. A 1.25 mm pinhole orifice in an aluminum plate can be used as the mask (not shown) and located directly in front of the blackbody source 52. The mask would then be imaged through the interferometer 46 onto the detector 54. Direct measurement indicates that the magnification of the system 44 is 0.83. Under these circumstances, the resulting width of the feature determined along both axes is approximately 1.66 mm which is somewhat larger than the expected value (1.44 mm) based on the size of the orifice image and the detector size (1 mm diameter in this example). A slightly out-of-focus image of the orifice is the probable cause of this discrepancy, nonetheless imaging capability is clearly demonstrated.

Figure 5:
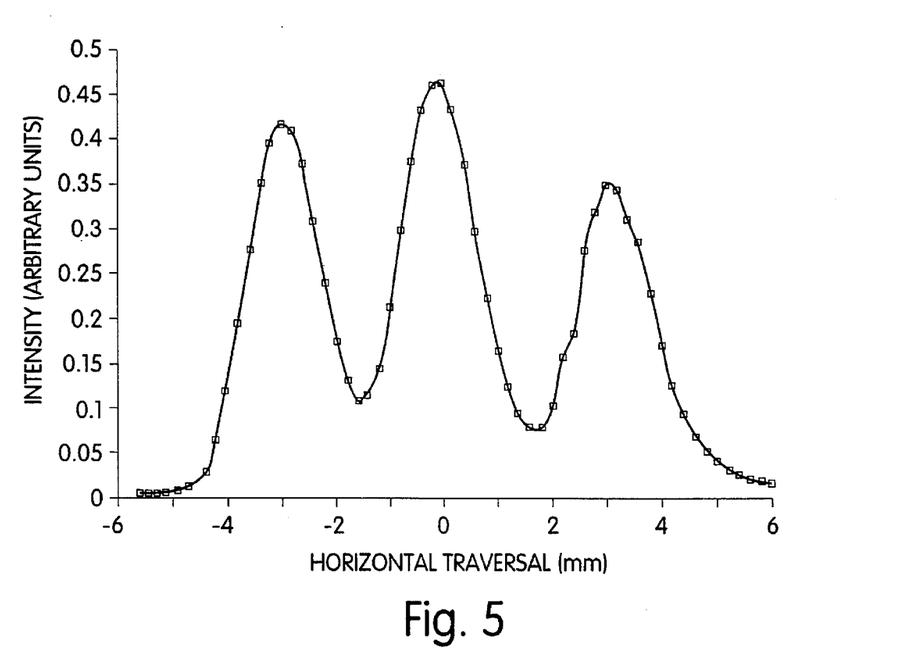
FIG. 5 is a graphical illustration of light intensity versus detector position when three pinholes are imaged with the spectrometer system of FIG. 3.

Referring to FIG. 5, the result of an experiment where the detector 54 is translated across an image of three 1 mm holes spaced on a line with separations of −3.5 and 4.1 mm is shown. Direct measurement indicates that the magnification is 0.83 as before. The separations of the three images as measured from FIG. 5 are −2.8 and 3.3 mm. The relative separation of the image and object indicate a magnification of 0.81 which is in very good agreement with the 0.83 determined via direct measurement of the image and object distances in this system. As in the previous exercise, the widths of the individual images are somewhat larger than expected given the detector and orifice dimensions and are likely due to a slightly out-of-focus image.

Figure 6:
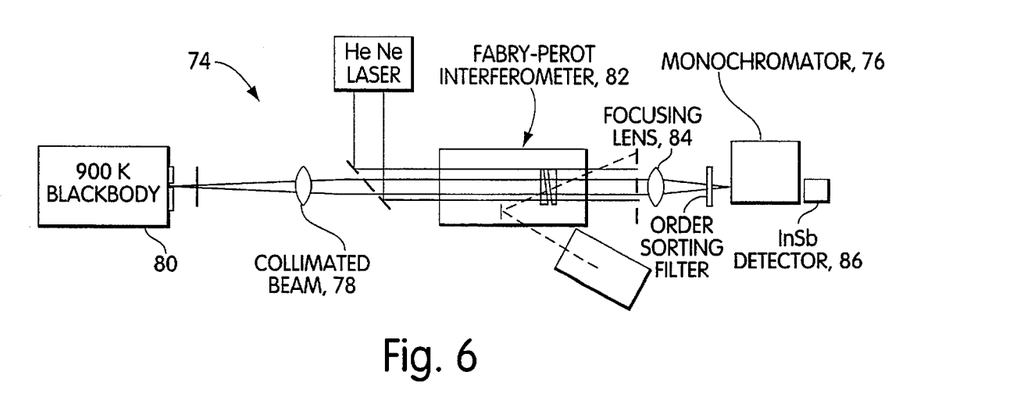
FIG. 6 is another low-order embodiment of a spectrometer system in accordance with the invention.

Referring to FIG. 6, in another low-order embodiment in accordance with the invention, a spectrometer system 74 is configured to establish the monochromatic nature of the invention. A 0.3 m monochromator 76 is equipped with a 150 groove/mm grating to spectrally resolve the transmitted radiation. A barium fluoride lens 78 is used to collimate light from a blackbody source 80 prior to entering a Fabry-Perot interferometer (FPI) 82, and a second barium fluoride lens 84 with the same f/number as the monochromator 76 is used for focussing the light exiting the interferometer onto an entrance slit of the monochromator 76. The focussing lens 84 is 2.5 cm in diameter and thus limited the effective aperture of the FPI 82 to 2.5 cm. An indium antimonide detector 86 with a 4 mm diameter element was used to capture radiation at an exit slit of the monochromator 76. The use of this relatively large area detector 86 eliminates the need for a relay lens to image the exit slit onto the detector 86. A longpass filter which allows transmission starting at 3.55 μm is used to eliminate shorter wavelength radiation diffracted in second and higher orders in the monochromator 76.

Note that both the system 44 of FIG. 3 and the system 74 of FIG. 6 preferably allow only near perpendicular light incident onto the mirrors of the interferometer and thus do not degrade the spectral resolution.

Figure 7:
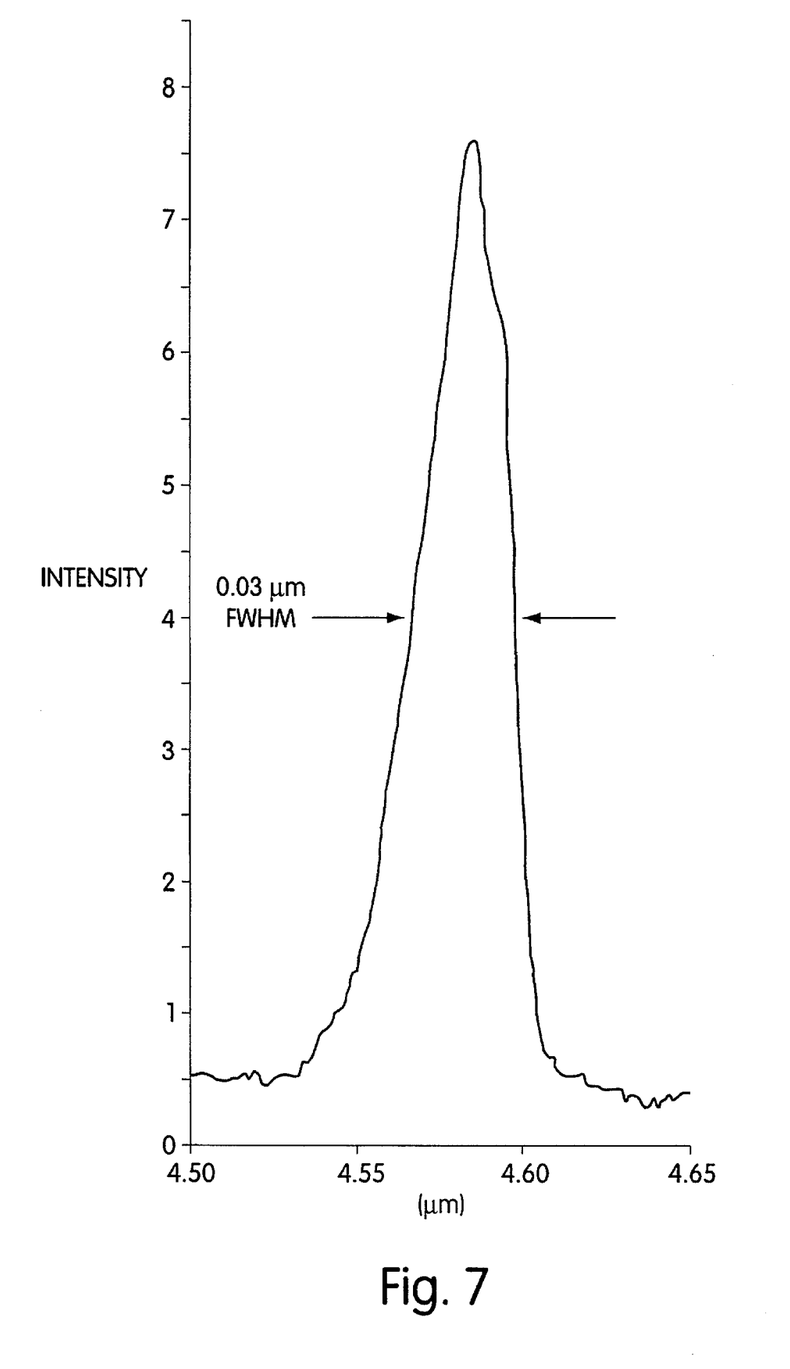
FIG. 7 is a graphical illustration of light intensity versus wavelength when the spectrometer system of FIG. 7 is operated with a transmission order of four.

The spectral resolution of the FPI 82 of FIG. 6 can be determined by using the monochromator 76 to disperse the radiation transmitted by the mirrors of the FPI 82. FIG. 7 shows a typical spectrum of the transmitted radiation. Prior to obtaining this data, parallelism of the mirrors in the FPI 82 can be established by observing evenly transmitted 0.6328 μm radiation through the FPI 82. The mirrors then can be moved in concert (e.g., using piezoelectric transducers) to transmit a wavelength of 4.58 μm (m=4). The resulting spectral resolution determined from the measurement is 0.30 μm FWHM. This corresponds to 0.5% of the center wavelength and a finesse of 38 that is characteristic of the entire 2.5 cm effective aperture of the mirrors, The finesse possible, based on the mirror reflectance at 4.58 μm, is in excess of 300. The lower finesse measured is consistent with the relatively rough surface finish of the mirrors employed. The mirrors used in this exercise are flat to λ/100 at 5.0 μm which corresponds to a flatness limiting finesse of 35 over the entire 5.1 cm aperture of the mirrors. The somewhat better finesse indicated by this exercise is consistent with the smaller effective aperture dictated by the focussing lens 84.

In general, higher resolution is achieved by increasing mirror spacing and thus reducing the free spectral range (FSR). To achieve extremely high resolution, a filter arrangement of a spectrometer according to the invention (e.g., the filter arrangement 24 of the spectrometer 10 of FIG. 1) can be a very narrow bandpass filter used for order sorting. If it is desired to examine a broad range of wavelengths at high resolution, many discrete bandpass filters typically are required. Applicants realized a simpler solution is to utilize a continuously variable bandpass filter which can be tuned to the wavelength of interest. A Fabry-Perot interferometer (FPI) operated with a mirror spacing comparable to the wavelength of interest is just such a filter and can be utilized instead of a plurality of conventional bandpass filters to yield a continuously tunable high-resolution spectrometer according to the invention. Thus, for example, the filter arrangement 24 of FIG. 1 can be a second tunable interferometer such as a FPI such that the spectrometer 10 of FIG. 1 includes two tunable interferometers, as described previously and below with reference to FIG. 8.

Figure 8:
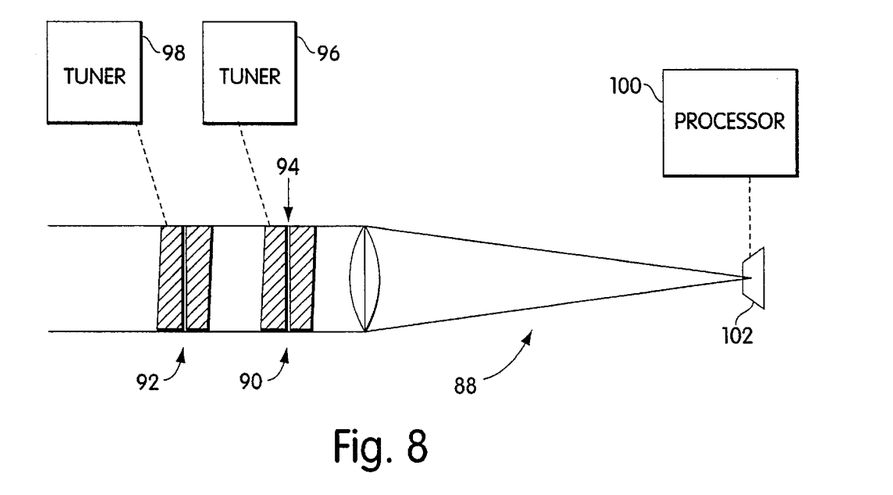
FIG. 8 is a functional block diagram of another spectrometer according to the invention.

In the embodiment of FIG. 8, a high-resolution, high-order spectrometer 88 according to the invention includes a first tunable interferometer 90 operated in high order and a second tunable interferometer 92 operated in low order. A mirror spacing 94 of the high-order interferometer 90 preferably is set to deliver a FSR comparable to or somewhat larger than the spectral resolution of the low-order interferometer 92. The spectral resolution of the spectrometer 88 is determined by the total finesse (F) and the FSR of each of the two tunable interferometers 90, 92. Specifically, the spectral resolution of the spectrometer 88 is given by $$\Delta\omega = FSR_1/F_1 = FSR_2/(F_1 \times F_2)$$

where the subscripts 1 and 2 refer to the high-order interferometer 90 and the low-order interferometer 92, respectively. The low-order interferometer 92 thus generally acts to isolate a single FSR of the higher-order interferometer 90, and the low-order interferometer 92 effectively serves as a continuously variable wavelength bandpass filter.

In one embodiment, the spectral resolution is 0.04% of the center frequency or less than 1 cm$^{-1}$ at an operating frequency of 2000 cm$^{-1}$. This resolution is sufficient to resolve spectral features arising from relatively large and as well as small molecules in the infrared. Such high resolution is a necessity in identifying, for example, large and complex environmental contaminants and chemical warfare agents.

Note that the spectrometer 88 typically includes a tuner 96, 98 for each interferometer 90, 92 and a processor module 100 associated with a detector 102. The tuners 96, 98 and the processor module 100 are similar to the tuner 28 and processor module 30 shown in and described with reference to FIG. 1. In general, all components shown in FIG. 8 are similar to like components shown in and described with reference to FIG. 1.

In general, a limitation of the spectral resolution and other performance characteristics achievable with either the low-order embodiments or the high-resolution, high-order embodiments is determined by the largest angle of incidence of light rays onto the interferometer, $\theta_{max}$. The value of $\theta_{max}$ is determined in a spectrometer according to the invention by the configuration of the collection optics (e.g., the collection lens 26 of FIG. 1), which is in turn established by the desired field of view (FOV). The value of $\theta_{max}$ is related to a corresponding frequency shift by $$\Delta\omega = (\omega(1-\cos\theta_{max}))/\cos\theta_{max}$$

where $\omega$ is the frequency of interest (in cm$^{-1}$) and $\Delta\omega$ is the largest tolerable frequency shift. The maximum value of $\Delta\omega$ becomes progressively smaller as the order, m, increases; a direct result of the reduction in FSR and corresponding increase in spectral resolution with higher-order operation. Defining $\Delta\omega$ as a fixed percentage of the spectral resolution shows that higher spectral resolution requires progressively smaller values for $\theta_{max}$.

For the arrangement of FIG. 1, smaller $\theta_{max}$ values translate into larger lens focal length, f, values and a correspondingly less efficient optical system in general. For example, a system similar to that shown in FIG. 1 having a finesse (determined by mirror parallelism, mirror reflectance, and mirror flatness) of 50 can be achieved. If $\Delta\omega$ is assumed to be 10% of the corresponding spectral resolution, the equation for FSR given previously results in $$\theta_{max}(m=1)=3.6 \text{ degrees,}$$

$$\theta_{max}(m=10)=1.1 \text{ degrees,}$$

and $$\theta_{max}(m=50)=0.5 \text{ degrees.}$$

For a 1×1 cm detector array, this translates into lens focal lengths (f) of 3.9, 12.4, and 27.9 cm, respectively. For a given configuration, a point of diminishing return will be reached for sufficiently high order operation as spectral resolution determined by the FSR becomes comparable to $\Delta\omega$. If a combination of large FOV and high resolution is required, a more sophisticated optical system must be employed than that shown in FIG. 2 such as a system which uses telecentric optics (e.g., a telecentric lens in place of the lens 42) to allow for collimation of collected light prior to final imaging.

A spectrometer according to the invention can be used in many applications such as spatially measuring chemical concentrations using passive emission or absorption of infrared radiation, detecting spectral emissions from spacecraft, aircraft, or land-based military and non-military equipment and personnel to identify and target, and use in existing military Forward-Looking Infrared (FLIR) sensing systems to improve the spectral resolution of these systems.

Having described both low-order and high-order embodiments, provided operational details, given examples, and indicated some possible applications, further details will now be provided.

Establishing Mirror Parallelism

To achieve proper operation of a spectrometer according to the invention, the mirrors of the interferometer(s) generally must be parallel with respect to each other. If the mirrors are tilted with respect to each other then the transmitted frequency typically varies across the mirror aperture. For a scene characterized by a continuum of frequencies, the effect typically will be an image characterized by a spatially distinct range of frequencies. For scenes containing discrete frequencies, the object of interest could become uneven in intensity and perhaps even discontinuous if the tilt were sufficiently severe.

Establishing mirror parallelism may be accomplished by uniform illumination, at normal incidence, of the mirrors with a collimated beam of radiation. The use of an expanded and collimated helium neon laser was described previously with relation to FIG. 3. Uniform tranmission of this "probe radiation" across the entire aperture of the interferometer guarantees even spacing of the mirrors to within a small fraction of the wavelength of the probe beam. An implementation of this technique in a spectrometer would involve the use of a permanently mounted beamsplitter that transmits infrared radiation while reflecting the probe radiation. Three or more photodiodes, mounted equidistant on the periphery of the mirrors, can be used as sensors. Uniform illumination of these sensors guarantees parallelism over the entire working aperture of the mirrors of he interferometer. Parallelism of the mirrors can be automated in a feedback loop which adjusts relative mirror tilt using, for example, piezoelectric transducers to tune the interferometer. Maximum parallelism is achieved when the average deviation of signals from the sensors are minimized. In order to maintain signal and avoid a null solution to the minimization problem (whereby the mirrors are tuned off resonance for the probe radiation), the sum of the signals from all the sensors can be simultaneously maximized. Parallelism is best established in this manner for mirrors of high flatness and high reflectivity at the probe wavelength. An interferometer having such mirrors typically is more sensitive to mirror tilt since the finesse determined by all other parameters except parallelism would be high.

This technique of establishing maximum parallelism and limiting finesse is only useful for mirror spacings that are half-integer multiples of the probe wavelength. Consequently, parallelism is established directly only for infrared (IR) radiation which is also a half-integer multiple of the probe laser wavelength. For other IR wavelengths, the finesse could be established at the half-integer multiple wavelength closest to the wavelength of interest. The mirrors can then be moved in concert to the appropriate separation. If a helium neon laser operating at 0.6328 μm is used to establish parallelism, the maximum traversal to any wavelength is λ/4 or 0.158 μm. Parallelism can be maintained over such small traversals if the appropriate correction factors are introduced for the differing responsivities of the piezoelectric transducers.

Establishing Mirror Separation

In general, the separation of the mirrors of the interferometer must be accurately setable. Various methods can be used to achieve accurate spacing. For example, a calibrated high resolution device such as a grating monochromator can be used to sample the light transmitted by the interferometer. This approach was described previously in connection with measuring the spectral resolution of the spectrometer system of FIG. 6. A spectrometer similar to that of FIG. 6 can be used with a hot continuum emitter to create a continuously tunable monochromatic reference source. For systems in which compactness is important, discrete frequency references can be built into the spectrometer. These discrete frequency references can be, for example, sealed cells of gas phase molecules with known absorption frequencies or discharge lamps filled with discrete atomic emissions. Molecular emission also can be used, provided the species utilized are readily excited. Solar and earth thermal radiation and atmospheric absorption features also can be used as convenient radiance, absorbance, and wavelength calibrations. Tuning to frequencies midway between those found in the references could be accomplished by interpolation. Interpolation is facilitated by the excellent "linearity of displacement with applied voltage" characteristics of some known piezoelectric transducers.

If imaging at wavelengths characteristic of one or a small number of species is required, a particularly attractive means of tuning presents itself. The species of interest could be used as an internal standard. For gas phase species this is particularly attractive since it could be sealed into a short closed cell and then Viewed as an absorber against a warm background. If needed, course mirror positioning would be established by determining the order of operation. For low order operation, this could be done in a manner similar to that used in establishing $m_{max}$ in the demonstration experiments.

When operating in the lowest few orders, mirror spacing can be established by the angle of incidence of a collimated beam of shorter wavelength radiation onto the mirrors. This can be done by first positioning the mirrors at the spacing corresponding to the smallest half-integer multiple ($m_{max}$) of the probe wavelength which is larger than the wavelength of interest. This multiple is uniquely determined by the angle of incidence at which both the $m_{max}-1$ order is transmitted and the probe radiation incident is perpendicular to the mirrors. The incidence angle of the probe radiation is then reduced to a value corresponding to the spacing of interest. This angle is uniquely determined by $$\cos \Theta = (m\lambda)/(2L)$$

where the transmission order is $m_{max}-1$. The mirror spacing then can be decreased until the beam is transmitted at maximum intensity through the mirrors.

The angle of incidence typically is quite sensitive to mirror spacing at low order. For example, if operation in lowest order is required and the desired wavelength is 5.06 µm, the desired mirror spacing is 2.53 µm. The equation provided immediately above dictates a corresponding angle of incidence for 0.6328 µm radiation of 28.9 degrees. Since this wavelength is a half-integer multiple of this separation, 0.6328 µm radiation which corresponds to $m_{max}=8$ is transmitted for perpendicular incidence.

For lowest order transmission of 4.70 and 4.56 µm radiation, the corresponding incident angles are 19.5 and 13.7 degrees, respectively. The large range of incident angles spanning only one transmission order at 0.6328 µm allows precise establishment of the corresponding mirror spacing. Operation in higher orders in the infrared generally can result in smaller ranges of incident angles and thus generally less precision in establishing mirror separation.

Other modifications and implementations will occur to those skilled in the art without departing from the spirit and the scope of the invention as claimed. Accordingly, the invention is to be defined not by the preceding illustrative description, but by the following claims.

What is claimed is:

1. A spectrometer comprising:
   a tunable interferometer for producing a two dimensional monochromatic and spatially continuous image of a scene at a desired wavelength at an image plane and including two mirrors having substantially parallel surfaces and an adjustable low order spacing therebetween relative to the desired wavelength,
   a radiation detector located at the image plane for recording the two dimensional image,
   a filter arrangement for allowing at least one predetermined range of wavelengths including the desired wavelength to pass to the detector, and
   a lens arrangement, between the interferometer and detector, for collecting radiation and limiting radiation incident on the interferometer to a field-of-view of at least one-half degree relative to a surface normal of the substantially parallel surfaces of the two mirrors such that the radiation forms a monochromatic and spatially continuous image at the image plane.

2. The spectrometer of claim 1 further comprising a tuner for adjusting the spacing between the two mirrors and thereby tuning the interferometer to select substantially the desired wavelength from a range of predetermined wavelengths.

3. The spectrometer of claim 2 further comprising a processor module for processing the image recorded by the detector prior to display of the image.

4. The spectrometer of claim 1 wherein the radiation detector comprises an optoelectronic detector.

5. The spectrometer of claim wherein the radiation detector comprises a single element.

6. The spectrometer of claim 1 wherein the radiation detector comprises an array of detectors.

7. The spectrometer of claim 1 wherein the radiation detector comprises a two-dimensional array of detectors for recording a two-dimensional monochromatic continuous image.

8. The spectrometer of claim 2 wherein the tuner comprises at least one piezoelectric transducer.

9. The spectrometer of claim 1 wherein the filter arrangement comprises at least one order-sorting interference filter.

10. The spectrometer of claim 1 wherein the filter arrangement comprises at least one bandpass filter.

11. The spectrometer of claim 10 wherein the filter arrangement comprises a timable bandpass filter.

12. The spectrometer of claim 11 wherein the tunable bandpass filter comprises a second tunable interferometer.

13. The spectrometer of claim 1 wherein the lens arrangement comprises a telecentric lens assembly.

14. The spectrometer of claim 1 wherein the interferometer operates in the infrared range of wavelengths.

15. The spectrometer of claim 1 wherein the lens arrangement collects radiation incident on the interferometer from a field-of-view of at least one-half degree, and a total finesse value associated with the interferometer is approximately 50.

16. A method of producing a two dimensional monochromatic and spatially continuous image of a scene at a desired wavelength, comprising:

providing a tunable interferometer including two mirrors having substantially parallel surfaces and an adjustable spacing therebetween relative to the desired wavelength, generating, by the interferometer, a monochromatic and spatially continuous image at an image plane, allowing, by a filter arrangement, at least one predetermined range of wavelengths including the desired wavelength to pass to a radiation detector located at the image plane, collecting, by a lens arrangement, radiation output from the interferometer, limiting, by the lens arrangement, the angles of radiation incident on the interferometer to a field-of-view of at least one-half degree relative to a surface normal of the substantially parallel surfaces of the two mirrors, and recording, by the radiation detector, the two dimensional monochromatic and spatially continuous image formed by the radiation at the image plane.

17. A spectrometer for forming a two-dimensional monochromatic and spatially continuous image of a scene at a desired wavelength, comprising:

a tunable interferometer for producing a two-dimensional monochromatic and spatially continuous image of a scene at a desired wavelength at an image plane including two mirrors having substantially parallel surfaces and a spacing therebetween which is continuously adjustable and which can be set to transmit the desired wavelength in orders of approximately ten or less, an optical system, between the interferometer and detector, for collecting image radiation output from the interferometer and for restricting image radiation incident on the interferometer to a field-of-view of at least one-half degree relative to a surface normal of the substantially parallel surfaces of the two mirrors, a filter for passing substantially only the range of wavelengths described by the desired order of interference and including the desired wavelength, and a radiation detector for receiving the image radiation output from the optical system to record the two-dimensional monochromatic and spatially continuous image formed thereon by the image radiation.

18. The spectrometer of claim 17 wherein the total finesse value associated with the interferometer is approximately 50, or less.

19. The spectrometer of claim 17 further comprising a tuner for adjusting the spacing between the two mirrors to enhance the contrast of the image and to tune the interferometer to pass substantially the desired wavelength selected from a range of predetermined wavelengths.

20. The spectrometer of claim 19 further comprising a processor module for processing the image to enhance the contrast of the image.

21. A spectrometer comprising:

a tunable interferometer for producing a two dimensional monochromatic and spatially continuous image of a scene at a desired wavelength at an image plane and including two mirrors having substantially parallel surfaces and an adjustable low order spacing therebetween relative to the desired wavelength, a radiation detector located at the image plane for recording the two dimensional image, a filter arrangement for allowing at least one predetermined range of wavelengths including the desired wavelength to pass to the detector, and a lens arrangement, between the interferometer and detector, for collecting radiation and limiting radiation incident on the interferometer to a field-of-view of at least about 1.0 degree relative to surface normal of the substantially parallel surfaces of the two mirrors such that the radiation forms a monochromatic and spatially continuous image at the image plane.

22. The spectrometer of claim 21 further comprising a tuner for adjusting the spacing between the two mirrors and thereby tuning the interferometer to select substantially the desired wavelength from a range of predetermined wavelengths.

23. The spectrometer of claim 22 further comprising a processor module for processing the image recorded by the detector prior to display of the image.

24. The spectrometer of claim 21 wherein the radiation detector comprises an optoelectronic detector.

25. The spectrometer of claim 21 wherein the radiation detector comprises a single element.

26. The spectrometer of claim 21 wherein the radiation detector comprises an array of detectors.

27. The spectrometer of claim 21 wherein the radiation detector comprises a two-dimensional array of detectors for recording a two-dimensional monochromatic continuous image.

28. The spectrometer of claim 22 wherein the tuner comprises at least one piezoelectric transducer.

29. The spectrometer of claim 21 wherein the filter arrangement comprises at least one order-sorting interference filter.

30. The spectrometer of claim 21 wherein the filter arrangement comprises at least one bandpass filter.

31. The spectrometer of claim 30 wherein the filter arrangement comprises a tunable bandpass filter.

32. The spectrometer of claim 31 wherein the tunable bandpass filter comprises a second tunable interferometer.

33. The spectrometer of claim 21 wherein the lens arrangement comprises a telecentric lens assembly.

34. The spectrometer of claim 21 wherein the interferometer operates in the infrared range of wavelengths.

35. The spectrometer of claim 21 wherein the lens arrangement collects radiation incident on the interferometer from a field-of-view of at least 1.1 degrees.

36. The spectrometer of claim 35 wherein a total finesse value associated with the interferometer is approximately 50.

* * * * *